United States Patent [19]

Espenscheid, deceased et al.

[11] Patent Number: 4,613,631

[45] Date of Patent: Sep. 23, 1986

[54] CROSSLINKED POLYMERS FOR ENHANCED OIL RECOVERY

[75] Inventors: Wilton F. Espenscheid, deceased, late of DeSoto, by Loretta Espenscheid, executor; James M. Paul, DeSoto, both of Tex.

[73] Assignee: Mobil Oil Corporation, New York, N.Y.

[21] Appl. No.: 737,380

[22] Filed: May 24, 1985

[51] Int. Cl.$^4$ .................... E21B 33/138; E21B 43/22; C09K 7/00
[52] U.S. Cl. ..................... 523/130; 106/162; 106/186; 166/246; 166/270; 166/271; 166/275
[58] Field of Search .............. 166/246, 270, 271, 275; 523/130; 106/162, 186

[56] References Cited

U.S. PATENT DOCUMENTS

| | | | |
|---|---|---|---|
| 3,208,518 | 9/1965 | Patton | 166/246 |
| 3,243,000 | 3/1966 | Patton et al. | 175/65 |
| 3,305,016 | 2/1967 | Lindblom et al. | 166/246 |
| 3,383,307 | 5/1968 | Goetz | 252/315.3 |
| 3,757,863 | 9/1973 | Clampitt et al. | 166/270 |
| 3,810,882 | 5/1974 | Browning et al. | 536/114 |
| 3,908,760 | 9/1975 | Clampitt et al. | 166/246 |
| 4,009,755 | 3/1977 | Sandiford | 166/270 |
| 4,069,869 | 1/1978 | Sandiford | 166/270 |
| 4,078,607 | 3/1978 | Carter et al. | 166/246 |
| 4,104,193 | 8/1978 | Carter et al. | 166/246 |
| 4,128,482 | 12/1978 | Knight | 166/246 |
| 4,199,625 | 4/1980 | Pilny et al. | 523/130 |
| 4,342,866 | 8/1982 | Kang et al. | 536/114 |
| 4,413,680 | 11/1983 | Sandiford et al. | 166/270 |
| 4,461,351 | 7/1984 | Falk | 523/130 |
| 4,485,020 | 11/1984 | Shay et al. | 166/246 |
| 4,554,974 | 11/1985 | Kalpakci et al. | 166/246 |

*Primary Examiner*—Ronald W. Griffin
*Attorney, Agent, or Firm*—Alexander J. McKillop; Michael G. Gilman; Malcolm D. Keen

[57] ABSTRACT

Polymers used in enhanced oil recovery operations, including polysaccharides, polyamides and cellulose derivatives may be crosslinked by the use of organic nitrogen compounds bearing at least two positively charged nitrogen atoms. Suitable crosslinking agents include the salts of aliphatic and aromatic diamines and bis (quaternary ammonium) compounds. The crosslinked copolymers may be used for mobility and permeability control purposes. The crosslinking agents are effective over a wide range of pH conditions to form stable gel structures with the polymers.

25 Claims, No Drawings

CROSSLINKED POLYMERS FOR ENHANCED OIL RECOVERY

FIELD OF THE INVENTION

This invention relates to crosslinked polymers which are useful for the control of mobility and permeability in subterranean oil-bearing formations. The invention also relates to methods for the enhanced recovery of oil using these polymers.

BACKGROUND OF THE INVENTION

In the production of oil from subterranean oil reservoirs by various flooding techniques, especially waterflooding, it has become a common expedient to add various polymeric thickening agents to the water in order to increase its viscosity to a point where it approaches that of the crude oil which is to be displaced from the reservoir, so as to improve the displacement of the oil by the flooding liquid. The use of polymers for this purpose is often stated to be for mobility control.

Another problem which arises in the various flooding processes is that different strata or zones in the reservoir often possess different permeabilities so that displacing fluids enter the high permeability or "thief" zones in preference to zones of lower permeability where significant quantities of oil may be left unless measures are taken to plug the high permeability zones wholly or partly and so divert the displacing fluid into the low permeability zones. Mechanical isolation of the high permeability zones has been attempted but vertical communication between reservoir strata often renders such measures ineffective. Physical plugging of the high permeability zones by cements and solid slurries has also been attempted with varying degrees of success but here, the most serious drawback is the possibility of permanently closing still productive horizons.

From these early experiences, the desirability of designing a viscous slug capable of sealing off the more permeable layers so that the flooding liquid would be diverted to the underswept, tighter regions of the reservoir, became evident. This led to the use of various oil/water emulsions, gels and polymers for controlling the permeability of the formations in processes frequently referred to as "profile control", a reference to control of the vertical permeability profile of the reservoir.

Among the polymers so far proposed for improving water flood conformance are the polyacrylamides, polysaccarides, celluloses, acrylic resins, silicates and polyisocaynurates. One group of polymeric thickeners which has received considerable attention for use in flooding processes is the polysaccharides, particularly those produced by the action of bacteria of the genous Xanthomonas on carbohydrates. For example, U.S. Pat. No. 3,383,307 discloses the possibility of using gelled polysaochardies for mobility control purposes, U.S. Pat. Nos. 4,078,607 and 4,104,193 describe a method for improving the efficiency of waterflooding operations by a particular prehydration technique for polysaccharides and U.S. Pat. No. 4,413,680 describes the use of crosslinked polysaccharides for selective permeability control in oil reservoirs. The polysaccharides have been used in both their normal, uncrosslinked form as well as in the form of crosslinked metal complexes, as described, for example, in U.S. Pat. Nos. 3,757,863 and 3,810,882. U.S. Pat. No. 3,908,760 discloses the possibility of using reducible, metal containing complex anions as a source of the crosslinking agent.

Proposals have also been made for crosslinking other polymers including polyacrylamides and cellulose derivatives for use in controlling the permeability of oil-bearing formations, and crosslinking processes of this kind are described, for example, in U.S. Pat. Nos. 4,009,755, 4,069,869 and 4,413,680.

The one disadvantage of a number of existing crosslinking agents is that they are effective only certain, defined conditions of pH and these conditions may not be the same as those at which the polymer functions most effectively. For example, certain polysaccharides function most effectively under alkaline conditions, e.g. pH 9, while the crosslinking agents which form the strongest complexes with these saccharides, such as chromium and aluminum salts, form precipitates in strongly alkaline solutions and these precipitates are generally ineffective for crosslinking. In addition, highly charged metal cations such as $Cr^{3+}$ have a high charge density by reason of their small ionic radius and this tends to distort the polymer with the result that the water may be squeezed out of the gel structure so that the gel is less stable than would be desirable. A further disadvantage of certain metal crosslinking agents is that they are relatively toxic and it would be desirable to avoid their introduction into the environment, particularly if there is a risk that the metal will enter aquifers from the oil-bearing formations. Finally, metal crosslinking agents such as chromium are relatively costly and it would be desirable to find cheaper alternatives. There is therefore a continuing need for the development of alternatives to existing crosslinking agents.

SUMMARY OF THE INVENTION

It has now been discovered that certain basic organic compounds are capable of acting effectively as crosslinking agents for polymeric thickeners. According to the present invention, the crosslinking agents which are used with the polymers are compounds which contain at least two positively charged nitrogen atoms, for example, the dihydrochlorides of piperazine and benzidine. The positively charged nitrogen atoms on these compounds are capable of forming bonds with the available crosslinking sites on the polymers and the presence of at least two of the charged nitrogens provides the possibility of forming the desired crosslinkages between polymer molecules.

The crosslinked polymers may be used in the conventional way for mobility and permeability control purposes in oil recovery operations.

The nitrogen compounds which may be used in this way have the advantage that they are stable under a wide range of pH conditions and therefore are capable of effectively crosslinking a wide variety of polymers under varying conditions of pH, e.g. under acid conditions, which may be at pH 4 or lower, neutral conditions and under alkaline conditions up to pH 12, pH 13 or even higher. In addition, the nitrogen compounds have a relatively lower charge density than many metal cations and therefore tend to distort the polymers to a smaller degree so that a more stable gel structure is obtained. They also tend to be less costly and toxic than many metal compounds and therefore may be used more readily in formations connecting with aquifers and at lower cost.

DETAILED DESCRIPTION

Polymers

The polymers which are used for forming the viscous aqueous liquids used in enhanced oil recovery operations are polymers which are capable of forming aqueous gels in the presence of water. These polymers are generally spoken of as being water soluble although in certain cases the polymer may form a dispersion rather than a true solution. In order to form the desired cross-linkages which provide the desired gel structures and properties, the polymers contain crosslinking sites which form coordinate crosslinkages with the crosslinking agent. These crosslinking sites are usually provided by functional groups in the polymer such as carboxylate, hydroxyl, carboxamido, which contain donor atoms such as oxygen, nitrogen or sulfur which are capable of forming coordinate bonds with the crosslinking agent. However, in certain polymers such as those containing oxygen in the polymer chain, coordination may occur directly with donor atoms in the polymer chain. Thus, in general, the polymers will be characterized by the presence of donor atoms in the polymer in positions where they are capable of forming coordinate crosslinkages. Oxygen tends to form the strongest and most stable crosslinkages and for this reason, oxygen containing polymers are generally preferred.

Polymers which are capable of forming the preferred coordination cross-linkages may be synthetic in origin or may be derived from natural sources. Suitable synthetic polymers include acrylic polymers, e.g. polyacrylic acid, polyacrylic acid esters, polyacrylaxide, partly hydrolyzed polyacrylamides, substituted polyacrylic acids such as polymethacrylic acid and polymethacrylic acid esters; partly hydrolyzed acrylic esters; copolymers of unsaturated carboxylic acids such as acrylic acid or methacrylic acid with olefins such as ethylene, propylene and butylene and their oxides; polymers of unsaturated dibasic acids and anhydrides such as maleic anhydride; and their copolymers with other monomers such as ethylene, propylene, styrene and methylstyrene, vinyl polymers, especially polyvinyl acetate and polyvinyl alcohol and polyalkylene oxides, e.g. as described in U.S. Pat. No. 4,413,680. Other exemplary synthetic polymers are described in U.S. Pat. No. 3,208,518 to which reference is made for a description of these polymers.

If the polymer does not possess appropriate functional groups for coordinating with the metals, they may be introduced by the use of grafting techniques or by reaction of a pre-formed polymer with a suitable reagent for introducing the desired groups.

Polymers of natural origin and biopolymers may also be used provided that they contain the appropriate cross-linking site densities. A preferred class of biopolymers which may be used include the polysaccharides produced by the action of bacteria of the genus Xanthomonas on a carbohydrate. The Xanthomonas polysaccharides, their methods of preparation, their use in various applications in the petroleum industry are well known and are described, for example, in U.S. Pat. Nos. 3,243,000; 3,305,016; 3,208,518; 3,810,882 and 4,413,680, to which reference is made for disclosures of these materials, their preparation and their use. Other polymers of natural origin that may be used include cellulose polymers, e.g. the hydroxyalkyl celluloses and carboxyalkyl celluloses and their alkali metal and ammonium salts, as described in U.S. Pat. Nos. 4,009,755; 4,069,869 and 4,413,680, to which reference is made for a detailed description of these polymers.

A particular polysaccharide which is commercially available and is preferred for use in the present invention is the ionic polysaccharide B-1459 produced by fermentation of glucose with the bacterium *Xanthomonas campestris* NRRL B-1459, U.S. Department of Agriculture. This polysaccharide is produced by culturing the bacterium *Xanthomonas campestris* in a well aerated medium having a pH of about 7 which contains commercial glucose, organic nitrogen sources, dipotassium hydrogen phosphate and appropriate trace elements. This polymer is available from the Kelco Chemical Company under trade name "Kelzan" from Pfizer under the trade name "Flocon" as well as from other commercial sources.

Another biopolymer which may be employed with the present organic cross-linking agents is the non-xanthan anionic polysaccharide biopolymer S-130 produced by the fermentation under aerobic conditions of a bacterium of the Alcaligenes species, ATCC 31555. Ihis polysaccharide is described in U.S. Pat. No. 4,342,866 to which reference is made for a description of it and of the method by which it may be produced.

The polymers are generally used at concentrations ranging from 1,000 to 5,000 ppm in order to achieve the desired gel consistency; in most cases, however, concentrations of 1,000 to 3,000 ppm will be adequate and about 2,000 ppm is normally preferred, although reservoir conditions may require other concentrations.

Crosslinking Agents

The crosslinking agents which are used in the present crosslinking process are organic compounds which contain at least two and possibly more positively charged nitroen atoms. The nitrogen atoms may be mono-, di-, tri-, or tetra-substituted nitrogen atoms, i.e. they may be present in the form of primary, secondary or tertiary amines or as quaternary ammonium compounds. Provided that at least two positively charged nitrogen atoms are present on the crosslinking agent in positions where they are available for forming coordinate crosslinkages with the available crosslinking sites on the polymer, the desired crosslinkages are capable of being formed.

The simplest crosslinking agents which may be used are the salts of diamines, including alkylene diamines such as ethylene diamine, propylene diamine, tetramethylene diamine and hexamethylene diamine and of aromatic diamines such as benzidine, 4,4'-diaminodiphenylmethane and of cyclic diamines such as piperazine, pyrazol (1,2 diazol), imidazole (1,3 diazol), 1,2 diazine, 1,4 diazine (pyrazine) and 1,3 isodiazol. Compounds containing secondary and tertiary nitrogen atoms may also be used provided that the nitrogens bear a positive charge. Thus, salts of secondary amines such as N,N-dimethyl-ethylenediamine; N,N-dimethyl-hexamethylenediamine; N,N-dimethyl-4,4'-diaminodiphenyl and N,N-dimethyl-4,4'-diaminodiphenylmethane may be used as may salts of tertiary amines such as N,N,N,N tetramethyl-ethylenediamine; and N,N,N,N-tetramethyl-diaminodiphenyl and N,N,N,N-tetramethyl-4,4'-diaminodiphenylmethane may be used. Bis (quaternary ammonium) compounds containing two tetrasubstituted nitrogen atoms may also be used; these compounds may be prepared by quaternizing ditertiaryamines with an alkylating agent such as an alkylester, an alkylsulfonate or an alkylchloride, using conventional procedures. Methods for producing quaternary ammonium compounds are described in Encylopedia of Chemical Technology, Kirk-Othmer, 3rd Edition, John Wiley and Sons, New York, 1982, Vol. 19, pp. 521-531, to which reference is made for a description of quaternary ammonium compounds and their methods of preparation.

Crosslinking

It generally suffices simply to mix the crosslinking agent with the polymer in appropriate proportions. Because various polymers will contain differing proportions of available crosslinking sites, the amount of crosslinking agent should be adjusted according to the polymer or polymers in use. Thus, where the polymer contains a high proportion of crosslinking sites as in a hydrolyzed polyacrylamide with a relatively high degree of hydrolysis, the relatively large number of carboxylate groups which form crosslinkages more readily than the carboximide groups will be able to form a more highly crosslinked structure than a polyacrylamide with a lower degree of hydrolysis. Thus, the relative amounts of polymer and crosslinking agent should be adjusted according to the type of polymer and the extent to which crosslinking is to proceed. As a general guide, the amount of crosslinking agent will be from 0.5 to 10 percent (molar or by weight) of the polymer or polymers. Thus, if the polymer is present in the normal amounts of 1,000-3,000 ppm, the cross-linking agent will generally be used in an amount from 5 to 300 ppm, although normally at least 10 ppm will be required and in most cases at least 25 ppm will be necessary to ensure a fully developed gel structure. Normally, the polymer will be dissolved or dispersed in water, preferably distilled or de-ionized water, and the crosslinking agent added to the dilution or dispersion. Crosslinking generally proceeds fairly rapidly with the progress of the crosslinking reaction indicated by a progressive increase in the viscosity of the aqueous liquid.

The functioning of the organic cross-linking agents is favored by the presence of inorganic ions, particularly divalent ions such as calcium, magnesium and barium and trivalent ions such as iron which may be present in oilfield brines in varying amounts may also contribute to cross-linking. Conventional cross-linking agents such as the trivalent ions of aluminum, chromium (III) or zirconium may also provide a cross-linking effect. Even in cases where the polymer forms a gel in the presence of inorganic cations such as calcium, the use of the organic cross-linking agent may be desirable to stabilize the gel structure over extended periods of time or for other advantages.

Oil Recovery Operations

The crosslinked polymers are used in enhanced oil recovery operations for mobility or permeability control purposes. To do this, an aqueous gel of the polymer, usually containing from about 100 to 10,000, preferably 1,000 to 5,000 ppmw of the polymer is injected into the formation through an injection well extending from the surface of the earth into the formation. For mobility control purposes, the polymer gel may be added to all or a part of the flooding liquid which is injected through the injection well. If the polymer is added only to a portion of the flooding liquid, it will generally be added to the first portion so that the flooding liquid which comes into contact with the crude oil in place in the reservoir has a viscosity and mobility which approximates to that of the oil in the reservoir so as to minimize fingering and channeling of the flooding liquid through the reservoir. When used for permeability control purposes, a slug of the thickened, aqueous liquid will be injected into the reservoir so that the polymer gel will penetrate into the more highly permeable regions of the reservoir so as to plug them and prevent the subsequent flooding liquid from penetrating into these regions at least, that is, until the less permeable regions have been swept by the flooding liquid. Because the gels undergo a reversible shear thinning, they will generally be less viscous during the injection sequence when they are passing through the pumping equipment and down the well into the formation under conditions of shear but when the gel enters the formation and the shear is removed, the gel will set up again in the formation to provide the desired plugging effect. Flooding operations then may proceed in the conventional manner by injecting the flooding liquid through the injection well and displacing the oil towards a production well which is situated at a horizontal distance or offset from the injection well. A number of injection and production wells may be provided in various patterns, e.g. in line or in various conventional flooding patents such as five spot, inverted five spot, seven spot or inverted seven spot. When used for permeability control purposes, the amount of the thickened aqueous liquid, i.e. the gel, which is injected will generally be from 10 to 100% of the pore volume of the highly permeable regions which are to be treated.

The invention is illustrated by the following Examples:

EXAMPLES 1-14

The anionic polysaccharide biopolymer S-130 in powder form was dispersed at the desired concentration in an oilfield brine by high speed mixing in a blender for about 20 minutes. The composition of the brine is set out in Table 1 below.

TABLE 1

| Brine Composition | | | |
|---|---|---|---|
| Cations | | Anions | |
| | mg/l | | mg/l |
| Sodium | 60,700 | Chlorine | 119,000 |
| Potassium | 156 | Bicarbonate | 0 |
| Magnesium | 1,950 | Carbonate | 0 |
| Calcium | 12,100 | Sulfate | N.D. |
| Barium | 122 | Hydroxide | 0 |
| Iron | 40 | | |
| Sum | 75,168 | Sum | 119,000 |

Total Dissolved Solids: 194,000 mg/l
Specific Gravity, 25° C.: 1.14739
pH: 4.25

Aliquots (100 ml) of the dispersed polymer were further treated with cross-linking agent and pH control agent (NaOH) by mixing in a small blender cup for about 15 seconds at low speed. The mixed samples were immediately placed in closed bottles in a 93° C. (200° F.) oven to promote rapid gelling. The samples were not held under inert atmosphere but all contained about 400 ppm formaldehyde to prevent microbial degradation.

The cross-linking agents used were piperazine dihydrochloride (PIP-2HCl) and putrescine dihydrochloride (1,4-butane diamine dihydrochloride, PUT-2HCl) in amounts from 10 to 200 ppm at a polymer concentration of 2,000 ppm. The amount of NaOH was adjusted to give a pH of 8.0 in the final sample.

The samples were inspected after extended periods of time (1 week and 1 month for Examples 1–10, 2 weeks and 5 weeks for Examples 11–14) for syneresis, i.e. gel separation. The degree of syneresis was estimated visually as the proportion by volume of separated water; the nature of the gel was also evaluated and noted.

For comparison, samples without added amine were included together with samples using chromium (III) as a cross-linking agent.

The results are shown in Table 2 below.

TABLE 2

Stability of S-130 Biopolymer

| Ex. | Cross-linker | Crosslinker Conc., ppm | pH | Syneresis, % 1 week | Syneresis, % 1 month | Comments |
|---|---|---|---|---|---|---|
| 1 | PIP-2HCl | 10 | 8.0 | 5 | 10 | Stiff gel |
| 2 | PIP-2HCl | 25 | 8.0 | 2 | 2 | Stiff gel |
| 3 | PIP-2HCl | 50 | 8.0 | 2 | 2 | Stiff gel |
| 4 | PIP-2HCl | 100 | 8.0 | 2 | 2 | Stiff gel |
| 5 | PIP-2HCl | 200 | 8.0 | 1 | 1 | Stiff gel |
| 6 | PUT-2HCl | 10 | 8.0 | 2 | 10 | Stiff gel |
| 7 | PUT-2HCl | 25 | 8.0 | 5 | 10 | Rigid gel |
| 8 | PUT-2HCl | 50 | 8.0 | 5 | 10 | Rigid gel |
| 9 | PUT-2HCl | 100 | 8.0 | 5 | 10 | Rigid gel |
| 10 | PUT-2HCl | 200 | 8.0 | 5 | 10 | Rigid gel |
| 11 | PIP-2HCl | 200 | 8.0 | 0 (1) | 0 (2) | Very firm |
| 12 | None | 0 | 8.0 | 1 (1) | 2 (2) | Rigid gel |
| 13 | Cr(III) | 25 | 8.0 | 10 (1) | 10 (2) | Stiff gel |
| 14 | Cr(III) | 50 | 8.1 | 10 (1) | 10 (2) | Stiff gel |

Notes
(1) 2 Week syneresis evaluation period
(2) 5 Week syneresis evaluation period It was noted in further experiments that the use of chromium (III) as cross-linking agent tended to create good gels, especially when used in relatively larger quantities, e.g. 75–200 ppm with 2,000 ppm of S-130 polymer but that the gels shrunk rapidly to small pellets or fell apart to fluffy residues.

We claim:

1. A method for crosslinking a gel-forming, water soluble polymer which comprises crosslinking the polymer with an organic compound bearing at least two positively charged nitrogen atoms in positions where they are available for forming coordinate crosslinkages with the available crosslinking sites on the polymer.

2. A method according to claim 1 in which the polymer is a water soluble polysaccharide.

3. A method according to claim 2 in which the polysaccharide is a polysaccharide produced by the action of bacteria of the genus Xanthomonas on a carbohydrate.

4. A method according to claim 1 in which the polymer is a polyamide or a partly hydrolyzed polyamide.

5. A method according to claim 1 in which the polymer is a cellulose derivative.

6. A method according to claim 1 in which the polymer is an anionic polysaccharide produced by fermentation of the bacterium ATCC 31555.

7. A method according to claim 1 in which the organic compound comprises a salt of an aliphatic diamine.

8. A method according to claim 1 in which the organic compound comprises a salt of an aromatic diamine.

9. A method according to claim 1 in which the organic compound comprises a bis (quaternary ammonium) compound.

10. A method according to claim 1 in which the organic compound comprises the dihydrochloride salt of 4,4'-diamino-diphenyl.

11. A method of making a thickened aqueous liquid for use in enhanced oil recovery operations which comprises crosslinking a water soluble polymer in aqueous solution with an organic compound bearing at least two positively charged nitrogen atoms in positions where they are available for forming coordinate crosslinkages with the available crosslinking sites of the polymer.

12. A method according to claim 11 in which the polymer is a water soluble polysaccharide.

13. A method according to claim 12 in which the polysaccharide is a polysaccharide produced by the action of bacteria of the genus Xanthomonas on a carbohydrate.

14. A method according to claim 11 in which the polymer is an anionic polysaccharide produced by fermentation of the bacterium ATCC 31555.

15. A method according to claim 11 in which the polymer is a polyamide or a partly hydrolyzed polyamide.

16. A method according to claim 11 in which the polymer is a cellulose derivative.

17. A method according to claim 11 in which the organic compound comprises a salt of an aliphatic diamine.

18. A method according to claim 11 in which the organic compound comprises a salt of an aromatic diamine.

19. A method according to claim 11 in which the organic compound comprises a bis (quaternary ammonium) compound.

20. A method according to claim 11 in which the organic compound comprises the dihydrochloride salt of 4,4'-diamino-diphenyl.

21. A method of controlling the permeability of a subterranean oil-bearing formation by the injection of an aqueous polymer gel into the formation through an injection well extending from the surface of the earth into the formation in which the aqueous polymer gel comprises a polymer which is crosslinked by means of a crosslinking agent comprising an organic nitrogen compound bearing at least two positively charged nitrogen atoms in positions where they are available for forming coordinate crosslinkages with the available crosslinking sites on the polymer.

22. A process according to claim 21 in which the amount of polymer in the gel is from 1,000 to 10,000 ppmw.

23. A process according to claim 22 in which the amount of polymer in the gel is from 1,000 to 5,000 ppmw.

24. In a flooding operation for the enhanced recovery of oil by the injection of a flooding liquid into a subterranean oil-bearing formation through an injection well extending from the surface of the earth into the formation, to displace oil from the formation to a production well situated at a horizontal distance from the injection well, the improvement comprising the use of a thickened flooding liquid comprising a polymer crosslinked by means of an organic nitrogen compound bearing at least two positively charged nitrogen atoms in positions where they are available for forming coordinate crosslinkages with the available crosslinking sites on the polymer.

25. A method according to 24 in which the flooding liquid comprises from 1,000 to 5,000 ppmw of the crosslinked polymer.

* * * * *